US012774173B2

(12) United States Patent
Ferreira et al.

(10) Patent No.: US 12,774,173 B2
(45) Date of Patent: Oct. 27, 2026

(54) ARTICLE PICKING AND PLACING SYSTEM

(71) Applicant: Anheuser-Busch InBev S.A., Brussels (BE)

(72) Inventors: Glenn Ferreira, Leuven (BE); Wim Dekocker, Leuven (BE); Philippe Jean Marie Duperray, Châteauroux (FR); Manu Peelman, Hamme (BE); Tom Van Moer, Hamme (BE); Kristof Lambrechts, Hamme (BE); Frederik Triest, Hamme (BE); David Rombaut, Hamme (BE)

(73) Assignee: ANHEUSER-BUSCH INBEV S.A., Brussels (BE)

(*) Notice: Subject to any disclaimer, the term of this patent is extended or adjusted under 35 U.S.C. 154(b) by 457 days.

(21) Appl. No.: 18/269,529

(22) PCT Filed: Dec. 21, 2021

(86) PCT No.: PCT/EP2021/087084
§ 371 (c)(1),
(2) Date: Jun. 23, 2023

(87) PCT Pub. No.: WO2022/136427
PCT Pub. Date: Jun. 30, 2022

(65) Prior Publication Data

US 2024/0092587 A1 Mar. 21, 2024

(30) Foreign Application Priority Data

Dec. 23, 2020 (BE) .................................. 2020/5971

(51) Int. Cl.
*B65G 47/08* (2006.01)
*B65B 21/06* (2006.01)

(52) U.S. Cl.
CPC ............ *B65G 47/084* (2013.01); *B65B 21/06* (2013.01); *B65G 2201/0244* (2013.01)

(58) Field of Classification Search
None
See application file for complete search history.

(56) References Cited

U.S. PATENT DOCUMENTS 6,868,652 B2 3/2005 Arends et al.
7,390,040 B2 * 6/2008 Subotincic ........... B25J 15/0616 414/737

(Continued)

FOREIGN PATENT DOCUMENTS

CN 105705257 A 6/2016
DE 1922739 A1 11/1970

(Continued)

OTHER PUBLICATIONS

International Search Report and Written Opinion for PCTEP2021087084 mailed dated Mar. 22, 2022, 9 pages.

*Primary Examiner* — Michael S Lowe
(74) *Attorney, Agent, or Firm* — ArentFox Schiff LLP

(57) ABSTRACT

The present invention provides an article picking and placing system, the system comprising: —a first article picking tooling and a second article picking tooling, and an intermediate transportation unit configured in between an article infeed transportation unit and an article outfeed transportation unit; —a control unit for synchronizing the first and second article picking tooling such that (i) the first article picking tooling picks and/or forms a first configuration of articles from the infeed transportation unit for transfer to the intermediate transportation unit, thereby forming an intermediate configuration on said intermediate transportation unit, and (ii) the second picking tooling picks a second configuration of articles from said intermediate transportation unit for transfer to the outfeed transportation unit, (Continued)

wherein the second and intermediate article configurations are different relative to each other and each different from the first article configuration.

13 Claims, 6 Drawing Sheets

(56) References Cited

U.S. PATENT DOCUMENTS

| | | | | |
|---|---|---|---|---|
| 8,671,651 | B2 | 3/2014 | Poutot | |
| 8,903,540 | B2 | 12/2014 | Stork et al. | |
| 9,302,361 | B2 * | 4/2016 | Hessbrueggen | B23Q 7/047 |
| 9,546,049 | B2 | 1/2017 | Lindauer | |
| 9,573,771 | B2 * | 2/2017 | Papsdorf | B65B 35/44 |
| 9,604,792 | B2 | 3/2017 | Wipf | |
| 10,150,219 | B2 | 12/2018 | Ridel et al. | |
| 11,511,946 | B2 * | 11/2022 | Gehin | B65G 47/088 |
| 2011/0036684 | A1 | 2/2011 | Bonnain | |
| 2015/0283708 | A1 * | 10/2015 | Crosby | B25J 15/0061<br>294/81.6 |
| 2016/0362257 | A1 | 12/2016 | Papsdorf et al. | |
| 2021/0229847 | A1 | 7/2021 | Kalany et al. | |

FOREIGN PATENT DOCUMENTS

| | | | |
|---|---|---|---|
| DE | 102010018153 | A1 | 10/2011 |
| DE | 102011016855 | A1 | 10/2012 |
| DE | 102011083377 | A1 | 3/2013 |
| DE | 202013105022 | U1 | 2/2014 |
| DE | 102013111088 | A1 | 4/2015 |
| DE | 102016211169 | A1 | 12/2017 |
| DE | 202018103487 | U1 | 8/2018 |
| DE | 102019115198 | A1 | 12/2020 |
| EP | 1803665 | B1 | 5/2009 |
| EP | 1530541 | B1 | 7/2009 |
| EP | 2338795 | B1 | 10/2012 |
| EP | 3105017 | A1 | 12/2016 |
| EP | 3317186 | B1 | 7/2019 |
| EP | 3577046 | A1 | 12/2019 |
| EP | 3405395 | B1 | 7/2020 |
| EP | 3181495 | B1 | 11/2020 |
| EP | 3778439 | A1 | 2/2021 |
| WO | WO0160697 | A1 | 8/2001 |
| WO | WO2015121668 | A1 | 8/2015 |
| WO | WO2018144552 | A1 | 8/2018 |

* cited by examiner

| REGULAR FORMATS | |
|---|---|
| Pattern ID | pattern |
| 1x3 | |
| 1x4 | |
| 1x5 | |
| 2x2 | |
| 2x3 | |
| 2x4 | |
| 2x5 | |
| 3x3 | |
| 3x4 | |
| 3x5 | |
| 3x6 | |
| 4x4 | |
| 4x5 | |
| 4x6 | |

| NESTED & ALIGNED PATTERNS | | | |
|---|---|---|---|
| Pattern ID | pattern | Pattern ID | pattern |
| A03 | | E10 | |
| A05 | | E13 | |
| A07 | | E16 | |
| A09 | | F12 | |
| B07 | | F16 | |
| B10 | | F20 | |
| B13 | | G14 | |
| B16 | | G18 | |
| C09 | | G22 | |
| C12 | | H05 | |
| C15 | | H08 | |
| D04 | | H11 | |
| D06 | | H14 | |
| D08 | | J06 | |
| D10 | | J08 | |
| | | J10 | |

FIG. 3

ARTICLE PICKING AND PLACING SYSTEM

TECHNICAL FIELD

The present invention generally relates to an article picking and placing system. More specifically, the system may be a packaging system. In particular, the articles may be beverage containers.

BACKGROUND

Articles or items such as food items, including liquid foods, home essentials, personal care, beverage containers, and the like, are usually grouped in various quantities, in a range of sizes and formats of secondary packages, before being packed in tertiary packaging for further distribution.

Generally, the packaging of one or more articles in so-called secondary packages involves multiple steps including receiving a supply of such articles from one or more in-feeds, picking up and dropping these in the packages and then closing the packages, which is conventionally been done by tooling such as described in patent no. DE1922739A1 disclosing a mechanism including a number of moving gripper sets, each gripper set having a plurality of gripping heads for supplying beverage containers into crates or boxes.

In particular, with regards to beverage containers, conventional reciprocating pick and place systems collect containers which have been routed into lanes and with the sets of containers to be picked being relieved of line pressure. Such solutions are of limited capacity and require infeed product laning and collation before picking, the functions and supply conveying of which typically take up much packaging hall real estate.

In addition, present solutions are capable of packaging only a limited range of packaging configurations (rows & columns), of handling only a limited range of containers (type, size (diameter and height), shape and weight) and without the possibility of efficiently and precisely executing container orientation.

Additionally, the present conventionally engineered packaging systems are constrained to pack only a limited range (type, size, shape, weight) of articles and in a limited range of packaging formats (number of rows, number of columns, aligned or nested patterns). Upon switching to different product/packaging configurations, conversion of current machine executions typically involve numerous and often manual adjustments and the extensive use of change parts. As a result the change-over periods tend to be long, labour demanding and incur a production rate ramp up after each changeover, all of which impacts plant productivity.

In an attempt to solve this problem, systems have been developed enabling more flexibility with respect to differentiating container configurations and reduced change-over periods. For example US20110036684A1 proposes an article configuration system aiming the articles, in particular beverage containers to be pre-configured before being delivered to the packaging machines (22, 24). Beverage containers which are fed by an infeed conveyor with typically two lanes, are transferred in a pre-defined bundle by a rotational transfer system to an output conveyor which is disposed at an angle relative to the infeed lanes. In a second step, an additional robot on the output conveyor applies a reconfiguration step for adapting the configuration of the bundle for further packaging.

It is clear that a container reconfiguration system as discussed above preceding the packaging machines is rather complex and occupies a large footprint.

Further, although such reconfiguration machine is able to deliver different container configurations without changeover, still a plurality of packaging machines is needed to pack each of the different configurations.

Given the above, it is a particular objective of the present invention to provide an article picking and placing system wherein the overall process from picking at an article infeed up to delivering the articles onto an output is performed in a highly efficient and flexible way, with limited number of article treatment steps, with reduced footprint, and at sufficient capacity.

It is also an objective of the present invention to provide an article picking and placing system wherein no article pre-pitching ist required at the infeed.

It is further an objective to provide an article picking and placing system with a focus on, as much as possible, non-impact on individual article handling.

It is another objective of present invention to provide a packaging machine enabling a highly efficient and flexible, preferably programmable, article picking and placing with limited number of article treatment steps, with reduced footprint, and at sufficient capacity, from article infeed to article placing in a packaging Particularly, it is an objective of the present invention to provide a packaging machine primary product picking, formatting and packaging loading module wherein the overall packaging process from picking at the infeed lanes, orienting, formatting, pitching and placing into or onto the secondary packaging is performed in a more compact, efficient and flexible, preferably programmable, manner, at industrial manufacturing capacity, across a broad range of primary container types and sizes, for an exceptional range of packaging formats, without requiring change parts and doing so with a limited (minimized) number of beverage container treatment steps.

It is further an objective to provide a packaging machine with pressureless, individual container handling, thus avoiding inter-container and container handling system impacts.

Another objective of the present invention is to provide a packaging machine supporting a wide range of packaging configurations in a highly efficient and flexible way.

In general, it is an objective of present invention to provide an article picking and placing system enabling more efficient and more flexible, preferably programmable, picking, orienting, formatting and placing with limited number of article treatment steps, with reduced footprint, and at sufficient capacity.

SUMMARY

In a first aspect in accordance with the present invention, an article picking and placing system is provided, the system comprising:

- a first article picking tooling and a second article picking tooling, and an intermediate transportation unit configured in between an article infeed transportation unit and an article output transportation unit;
- a control unit for synchronizing the first and second article picking tooling such that (i) the first article picking tooling picks and/or forms a first configuration of articles from the infeed transportation unit for transfer to the intermediate transportation unit, thereby forming an intermediate configuration on said intermediate transportation unit, and (ii) the second picking tooling picks a second configuration of articles from said intermediate transportation unit for transfer to the output transportation unit, wherein the second and intermediate article configurations are different relative to each other and each different from the first article configuration.

In an embodiment, the infeed transportation unit does not provide said first configuration ready to be picked by the first article picking tooling, but supplies a number of articles in a certain configuration, in rows, or randomly, or even a mix of different types of articles, from which the first article picking tooling picks and forms the first configuration for transfer to the intermediate transportation unit.

Advantageously, while transferring the picked articles, the first article picking tooling may orient, uniformly pitch, collate, group and group pitch the picking articles thereby forming the first configuration(s) before delivering onto the intermediate transfer conveyor unit for building the intermediate configuration.

In the context of the present invention, the articles may be food or non-food articles. In a particular case, the articles are liquid containers, and more particularly beverage containers such as bottles, cans, jars, etc.

In a further aspect in the accordance with the present invention, a packaging machine is provided comprising an article picking and placing system as described throughout this text.

In another aspect in accordance with the present invention, an article picking and placing method is provided, the method comprising:

- providing an intermediate transportation unit configured in between an article infeed transportation unit and an article output transportation unit;
- picking and/or forming a first configuration of articles from the infeed transportation unit and transfer it to the intermediate transportation unit, thereby forming an intermediate configuration on said intermediate transportation unit,
- picking a second configuration of articles from said intermediate transportation unit and transfer it to the output transportation unit, wherein the second and intermediate article configurations are different relative to each other and each different from the first article configuration.

BRIEF DESCRIPTION OF THE DRAWINGS

FIG. 3 illustrates a number of different second article configurations that may be obtained by an article picking and placing system in accordance with the present invention;

DETAILED DESCRIPTION

Specific structural and functional details as disclosed in the embodiments below are not to be interpreted as limiting, but merely as a basis for the claims and as a representative basis for teaching one skilled in the art to variously employ the present invention in virtually any appropriately detailed structure. It is to be understood that each specific portion includes all technical equivalents that operate in a similar manner to accomplish a similar purpose.

Figure 1:
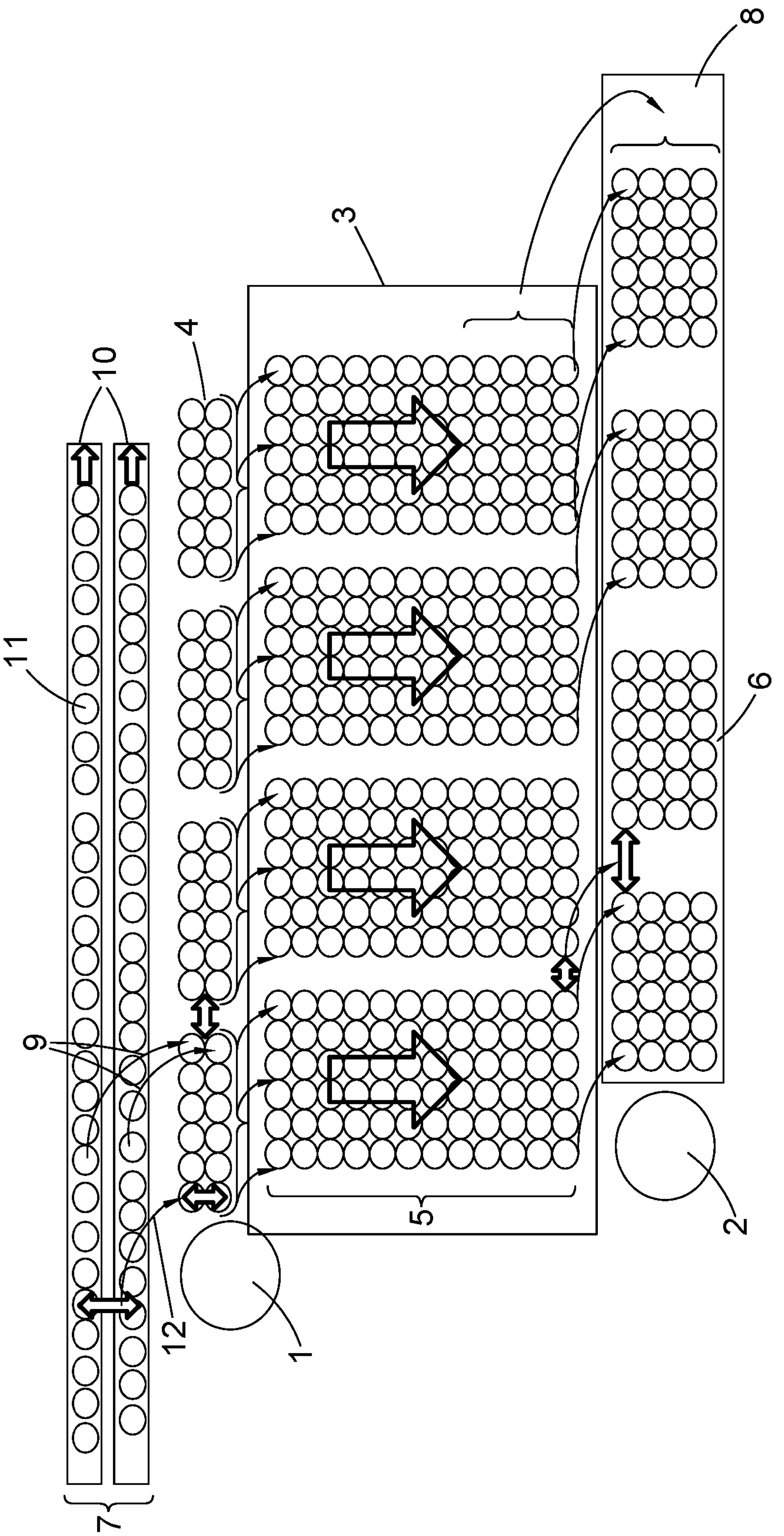
FIG. 1 and FIG. 2 both illustrate a schematic diagram representing an article picking and placing system in accordance with the present invention.
Figure 2:
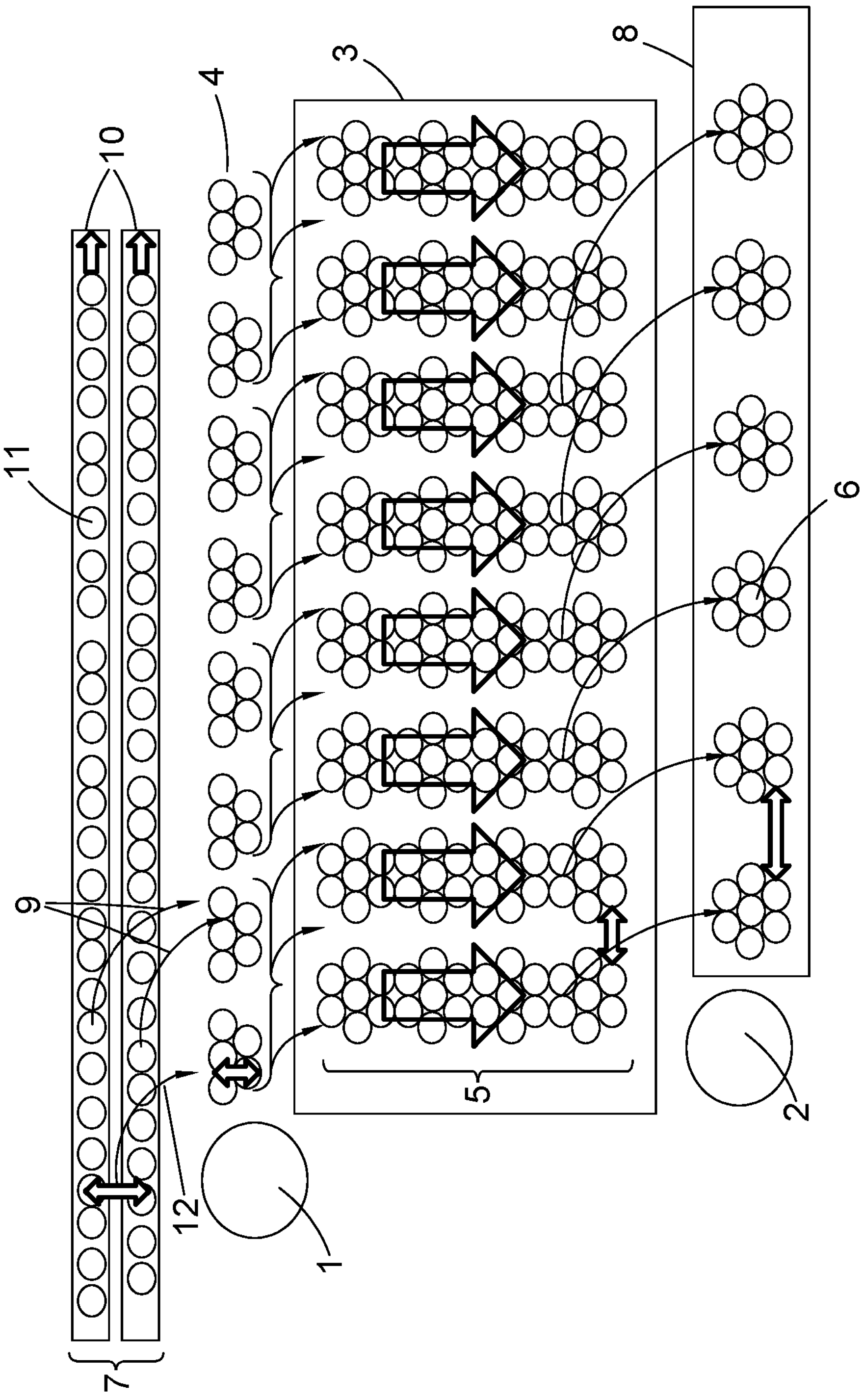

In a first aspect in accordance with the present invention, an article picking and placing system as schematically illustrated in FIG. 1 and FIG. 2, is provided, the system comprising:

- a first article picking tooling (1) and a second article picking tooling (2), and an intermediate transportation unit (3) configured in between an article infeed transportation unit (7) and an article output transportation unit (8);
- a control unit (not shown) for synchronizing the first and second article picking tooling such that (i) the first article picking tooling picks and/or forms a first configuration (4) of articles from the infeed transportation unit (7) for transfer to the intermediate transportation unit (3), thereby forming an intermediate configuration (5) on said intermediate transportation unit (3), and (ii) the second picking tooling (2) picks a second configuration (6) of articles from said intermediate transportation unit for transfer to the output transportation unit, wherein the second (6) and intermediate (5) article configurations are different relative to each other and each different from the first article configuration (4).

In an embodiment in accordance with the present invention, the first article picking tooling dynamically synchronizes with and picks row quantities of articles from randomly pitched and oriented rows of infeed articles and while in transfer to the intermediate transport unit, uniformly pitches, orients (optional), groups and group pitches the rows of picked articles to form a first configuration (4) of articles for transfer to the intermediate transportation unit (3), thereby forming an intermediate configuration (5) on said intermediate transportation unit (3). The second picking tooling (2) dynamically picks a second configuration (6) of articles from said intermediate transportation unit, for transfer and synchronized, dynamic delivery to the output transportation unit, wherein the second (6) and intermediate (5) article configurations are different relative to each other and each different from the first article configuration (4).

In an embodiment, the infeed transportation unit and/or the intermediate transportation unit and/or the output transportation unit are in motion, i.e. in transit, during picking and placing of articles.

In a first step, the picking and placing system picks a first configuration (4) of articles from an infeed transportation unit (7) and delivers it to the intermediate transportation unit (3) for forming an intermediate article configuration (5). Said picking (9) may include picking from one or more lanes (10) of articles (11). The articles in the one or more lanes (10) may be uniformly pitched or may arrive randomly. The intermediate configuration (5) of articles is different from the first configuration (4) in that the size of the configuration, and/or its surface area shape, and/or the pitch between the articles within the intermediate article configuration is different from the first configuration. In a second step, the picking and placing system picks a second article configuration (6) from the intermediate transportation unit (3) and delivers it onto the output transportation unit (8). This second article configuration (6) is a part of the intermediate configuration (5) and is different from the first configuration (4) in size and/or in surface area shape, and/or in pitch between the individual articles.

In an embodiment of the present invention, the intermediate configuration (5) of articles (11) may consist of a plurality of first article configurations (4). In this case, the first article picking tooling (1), while performing consecutive picking and forming first configurations (4) of articles (11) from the infeed transportation unit (7), forms an intermediate configuration (5) on the intermediate transportation unit (3) which is consequently built from several subsequent first configurations (4).

In a particular embodiment of the present invention, the first configurations from consecutive picking operations may sequentially vary depending on the type of intermediate configuration to be built, eg. 6×2-4×2-6×2-4×2.

In an embodiment, the first article picking tool is able to pitch two or more picked parallel rows (10) together to form a first article configuration (4) and to deliver them adjacently onto the intermediate transportation unit (3) thereby forming intermediate configurations (5) which are fed forward by the intermediate transportation unit in the direction of the second article picking tool (2). These intermediate configurations may be extended across machine direction and/or in the direction of the second picking tool, for example column-like as shown in FIGS. 1 and 2.

In an embodiment of the present invention, the second configuration of articles may consist of a part of a first article configuration. In this case, the second article picking tooling picks a configuration of articles from the intermediate configuration which consists of a part of one first article configuration.

In another embodiment of the present invention, the second configuration of articles may consist of at least a part of at least two consecutive first article configurations. In this case, the second article picking tooling picks a configuration of articles from the intermediate configuration which consists of at least a part of at least two consecutive first article configurations.

In the system of the present invention, the first and/or second article picking tooling may comprise one or more pluralities of individual gripping heads, each plurality of gripping heads being position and motion controlled. Such position and motion control allows matching various pitches on the infeed transportation unit (7) or on the intermediate transportation unit (3) and to accurately pick even in case the article configurations to be picked have variable pitch and/or variable pace. In addition, the position and motion control of the each plurality of gripping heads may further picking articles showing various pitches on the infeed transportation unit (7) or on the intermediate transportation unit (3) between several and/or consecutive picking cycles.

In a preferred embodiment, the individual gripping heads may be position and motion controlled such as to match the position and pace of a respective individual infeed article. Individual position and motion control allows the system to accurately pick individual articles in case the article configurations at the infeed transportation are variable or not uniform or even in case the article infeed is random. In order to scan the present and exact position of an individual article at the infeed, the system may comprise any of type of electronic imaging system and/or position sensing system to dynamically scan the articles and to determine each article position and orientation on the respective infeed conveyor.

In order to allow the gripping heads to be individually position and motion controlled, they may be mounted on independent, motion-controlled movers on one or more support rails on the article picking tooling. These support rails may be mounted on a frame comprising a vertical moving mechanism for enabling a vertical movement of the gripping heads to pick up a configuration of articles from the infeed transportation unit.

Figure 4A:
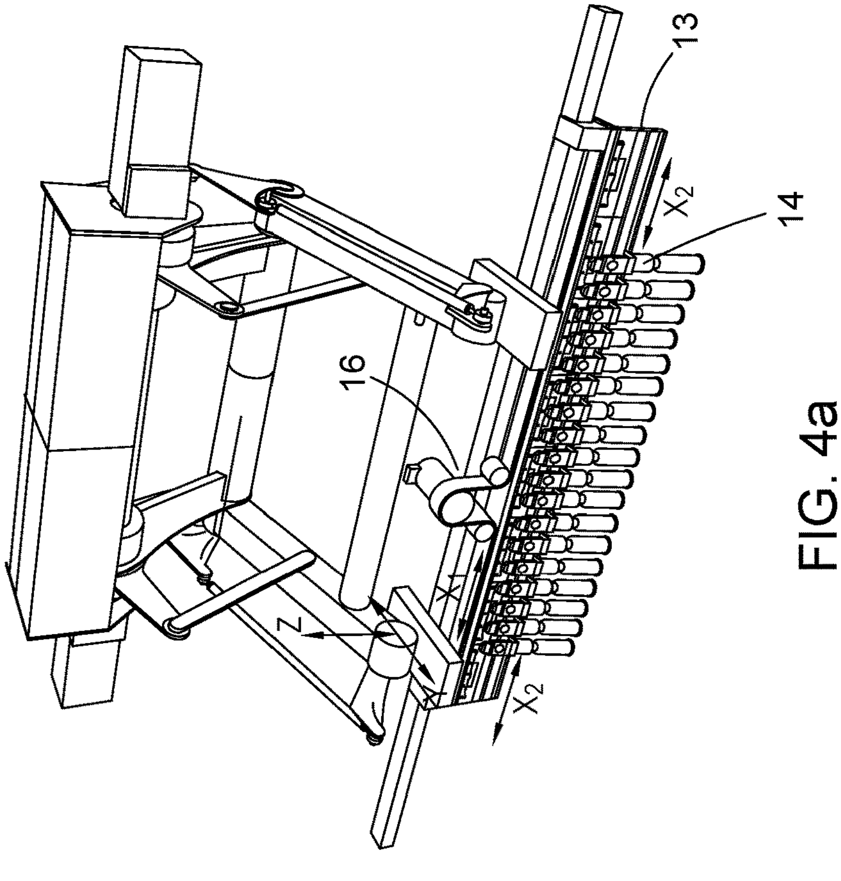
FIGS. 4*a*, 4*b* and 5 illustrate different article picking tools as may be used in an article picking and placing system, in accordance with the present invention.
Figure 4B:
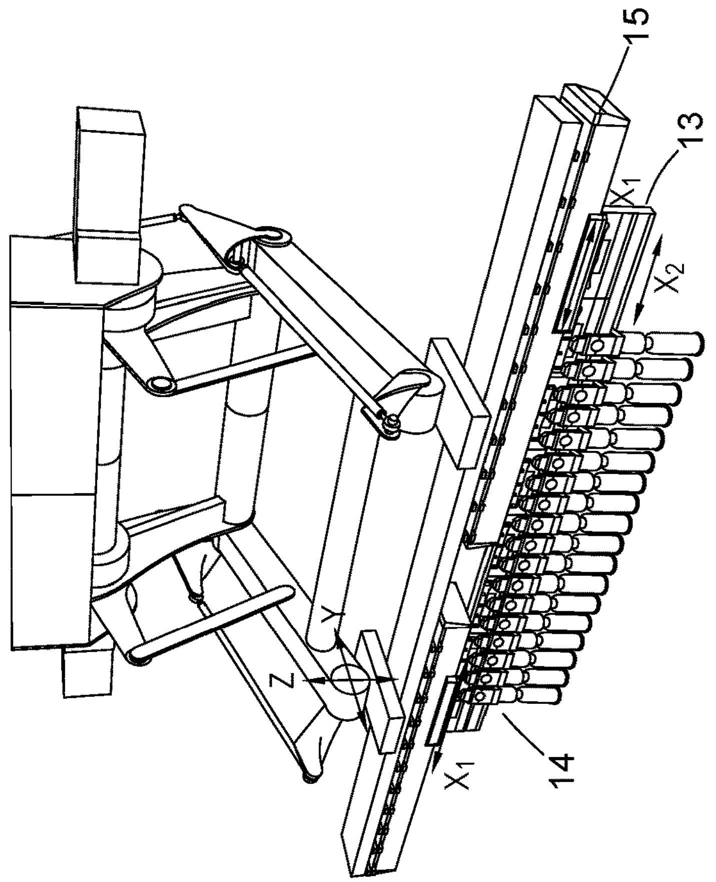

Such frame with vertical moving mechanism may be part of a gantry system enabling 3-axis movement of the gripping heads. This is typically achieved by the gantry system moving the one or more support rails in Z-direction (vertical direction i.e. up and down) and in Y-direction (horizontal across machine direction i.e. back and forth between the respective transportation units), while the movers with the gripping heads move on the support rail(s) in X-direction (horizontal in machine direction i.e. following the articles in transit). Advantageously, this 3-axis movement of each of the gripping heads may also be executed via a 3-axis gantry system as illustrated in FIGS. 4*a* & 4*b* wherein the gantry not only enables movement of the support rail (13) in Z and Y direction, but also movement of the support rail as a whole including the gripping heads (14) in X-direction (X1), and as such reducing the actual movement (X2) of the gripping heads required on the support rail. In this way, the duty of the independent mover transportation mechanism is reduced, thus avoiding overloading and faulting. In addition, each gripping head can still move on its support rail in X-direction (X2). Movement of the support rail(s) as a whole in X-direction may be obtained by, for example: a linear thruster mechanism (15) or by a belt drive and slide mechanism (16) or any other motion and position controlled linear axis guide and propulsion arrangement.

Figure 5:
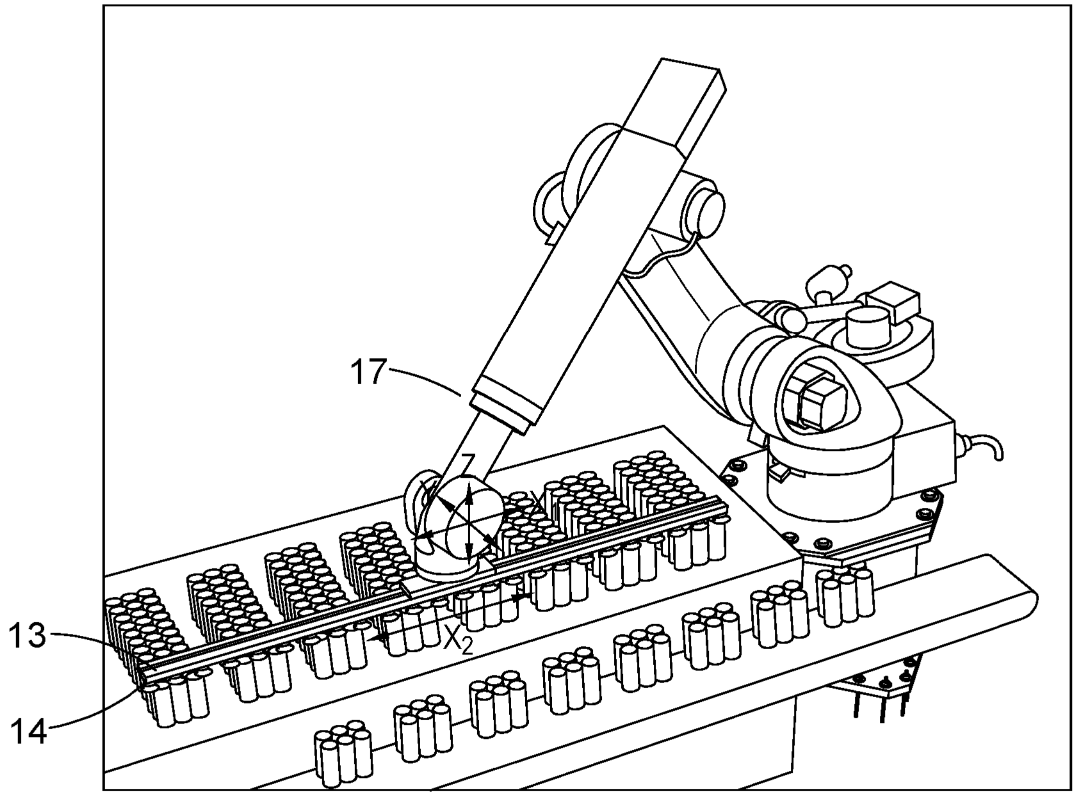
Figure 6:
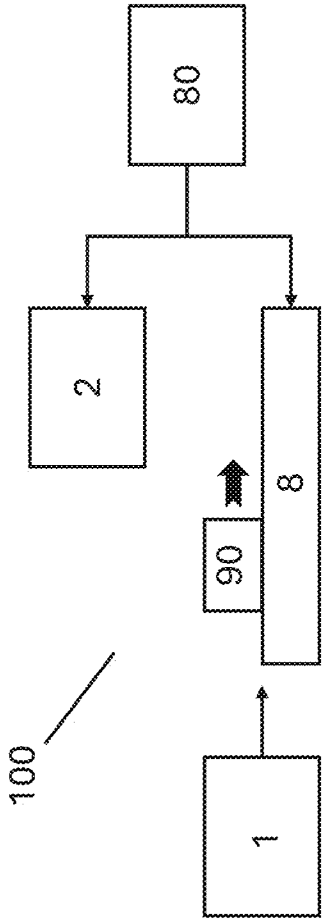
FIG. 6 illustrates a packaging machine in accordance with the present invention.

As illustrated in FIG. 5, an alternative to mounting the one or more support rails (13) on a frame, is to mount it on a robot, more specifically a 3D industrial robot (17) (eg. ABB, Kuka, Fanuc) and take advantage of the 3-axis movement of such robot, namely it enables 3-axis movement (Z, Y, X1) of the support rail as a whole including the gripping heads, as such reducing the actual movement (X2) of the gripping heads required on the support rail. In this way, the duty of the independent mover transportation mechanism is reduced, thus avoiding overloading and faulting.

In an embodiment of the present invention, at least the first article picking tooling (1) may comprise a plurality of said support rails mounted in parallel and a support rail moving mechanism for varying the distance between said support rails. By varying the distance between support rails, the pitch between individual gripping heads in a direction transversal to the support rails is varied to match any pitch between two or more parallel lanes (10) of the infeed transportation unit (7) and to re-pitch the picked rows (12).

In a further embodiment in accordance with the present invention, the individual gripping heads may be adapted to selectively orientate and/or rotate an individual article during the transfer from the infeed transportation unit (7) to the intermediate transportation unit (3), or from the intermediate transportation unit to the output transportation unit (8). Each gripping head may incorporate means of controlled rotation of the gripping head about its longitudinal axis. Orientation may be required for example for esthetical reason, for example articles may be rotated about their longitudinal axis to align e.g. surface prints or labels.

Person skilled in the art will appreciate that the first and second article picking tool may be positioned relative to the respective infeed, intermediate and output transportation unit, dependent on the type of picking tool used, such as a gantry based system, an overhead frame based system, robot based, etc.

The control of the article picking and placing system of the present invention may control the movement of the support rails and the movement of its gripping heads such that the gripper heads achieve a primary gripper head configuration in accordance with the configuration of the articles on the infeed transportation unit (7) and/or on the intermediate transportation unit (3).

Further, the control system may be enabled to synchronize the pace and pitch of the gripping heads of the first article picking tooling with the pace and pitch of the articles present at the infeed transportation unit, in machine direction, and the pace and pitch of the articles on the intermediate conveyor unit, typically across machine direction, and in particular in case the articles at the infeed transportation unit are in transit, i.e. continuously moving while the picking operations are taking place.

The control system may also be enabled to synchronize the pace and pitch of the gripping heads of the second article picking tooling with the pace and pitch of the output transportation unit, in machine direction, and the pace and pitch of the articles on the intermediate conveyor unit, across machine direction, thereby accurately obtaining the desired position of the articles on the output transportation unit, and in particular in case the packaging at the output transportation unit are in transit, i.e. continuously moving while the article placing (loading) operations are taking place.

In operation, the movers upon which the picking heads are mounted are position and motion controlled to match the pitch of the articles while also being propelled along the support rail. Thus while travelling at the same velocity as the articles and, in case of beverage containers, with each picking head having been independently centered over the lid or closure of each beverage container to be picked, with down and up movement of the frame or robot of the article picking tooling, the articles are dynamically picked up from the infeed transportation unit. The reverse operation occurs at the output transportation unit.

In the context of the present invention, the articles may be food or non-food articles. In a particular case, the articles are liquid containers, and more particularly beverage containers such as bottles, cans, jars, etc.

In a further aspect in the accordance with the present invention, a packaging machine is provided comprising an article picking and placing system as described throughout this text. Such packaging machine enables the overall packaging process starting from the infeed lanes up to the packaging operation to be performed in highly efficient and flexible ways, with limited number of process steps, with reduced footprint, and at sufficient capacity.

Further, such packaging machine may support a wide range of packaging configurations, e.g. styles of 1-way through 4-way (number of rows) and by −2 through by −6 (number of columns) in terms of columns, preferably being also capable to perform single or double or more container layer assemblies (i.e. interlayers being insert between, if necessary, or eg. cans directly nesting together) and formation of nested and/or row column aligned packaging format patterns (eg. triangular 3 packs or pentagon 6 packs or parallelogram nested 8 packs etc.), as is illustrated in FIG. 3.

In a preferred embodiment of such packaging machine (100), the control system (80) is enabled to synchronize the pace and pitch of the gripping heads of the second article picking tooling (2) with the pace and pitch of any packaging in assembly (90), present on the output transportation unit (8), wherein the output transportation unit (8) transports packaging in assembly (90), concurrently with the transportation by the second picking tooling (2) of articles in a output configuration (6); such that the articles in output configurations (6) are placed in the packaging at the output transportation unit in transit, i.e. while articles as well as packaging are continuously moving.

In another aspect in accordance with the present invention, an article picking and placing method is provided, the method comprising:

- providing an intermediate transportation unit configured in between an article infeed transportation unit and an article output transportation unit;
- picking and/or forming a first configuration of articles from the infeed transportation unit and transfer it to the intermediate transportation unit, thereby forming an intermediate configuration on said intermediate transportation unit,
- picking a second configuration of articles from said intermediate transportation unit and transfer it to the output transportation unit, wherein the second and intermediate article configurations are different relative to each other and each different from the first article configuration.

In general, the picking and placing method of the present invention includes a two-step sequential (i.e. continuous) operation to dynamically pick any of a large range (ie. different type, size, shape, weight) of articles from one or more infeed transportation units and dynamically deliver them, orientated and collated into the desired configurations, being any of a wide range of article configurations (i.e. different number of rows, columns, layers, patterns) onto an output transportation unit optionally supporting pack transportation carriers which are continuously moving (so called in transit) while being loaded with the second configurations of articles.

The functional sub steps performed in step 1 may be outlined as follows:

- dynamically picking up a first configuration (4) of articles (11), from a infeed unit that may consist of one or more infeed rows, said infeed supporting randomly pitched and/or randomly orientated articles, said picking is while the articles are in transit, from the one or more infeed units;
- arranging the pitch between the picked articles in machine direction and transferring them from the infeed unit (7) to an intermediate transportation unit (3), The intermediate configuration (5) of articles is formed by repeating the previous outline of sub steps; by dynamically delivering the picked first configuration on the forward feeding intermediate conveyor.

While in transfer from the infeed unit (7) to the intermediate transportation unit (3), the following arrangements may be executed, all in transit, by the first picking tooling (1):

- the pitch between articles in machine direction (x-axis) may be changed, adjusted or adapted,
- the first configuration may be (re-) grouped and/or partially re-pitched into an intermediate configuration, and,
- the articles may be oriented and/or rotated to targeted orientations as e.g. determined from e.g. article imaging at the entry to the infeed unit.

The intermediate transportation unit (3) may be a wide, matt top, table conveyor.

The functional sub steps performed in step 2 may be outlined as follows:

- dynamically picking up, from the intermediate transportation unit (3), a second article configuration (6), being typically a desired number of rows of pre-grouped and pitched rows of articles from the intermediate transportation unit (3),
- while in transit, completing the preparatory re-pitching of the intermediate configurations (5) into the second configuration (6) ahead of dynamic delivery onto the output transportation unit (8), dynamically delivering the second configurations onto the output transporting unit, for example on the carriers in transit.

Person skilled in the art will appreciate that, in an embodiment according to the present invention, the article picking and placing system is enabled to perform all the method sub steps outlined above.

In addition, it may perform all the sub steps outlined above without losing orientation control of the articles or disturbing the orientations once orientated.

Further, the packaging machine in accordance with the present invention has the ability for mosaic orientation of articles with sets of so ordered and oriented articles providing for large net effect labelling where each oriented article makes up part of a larger marketing graphic.

In addition, the packaging machine in accordance with the present invention may perform all the sub steps outlined above without any damage to the articles, for example without damaging beverage container neck foils, labelling, container surface finishes or other forms of decoration.

Another additional benefit of a packaging machine in accordance with the present invention is that it delivers high capacity and high flexibility, while maintaining regular tethered connections, such as power cabling, control system wiring, pneumatic and vacuum tubing and cooling supply and return hosing, with devices and drives and without the necessity to step to higher untethered, contactless, wireless technologies.

The invention claimed is:

1. An article picking and placing system, the system comprising:

a first article picking tooling and a second article picking tooling, and an intermediate transportation unit configured in between an article infeed transportation unit and an article output transportation unit; and a control unit for synchronizing the first and second article picking tooling such that (i) the first article picking tooling picks and/or forms a first configuration of articles from the infeed transportation unit for transfer to the intermediate transportation unit, thereby forming an intermediate configuration on said intermediate transportation unit, and (ii) the second article picking tooling picks a second configuration of articles from said intermediate transportation unit for transfer to the output transportation unit, wherein the second and intermediate article configurations are different relative to each other and each different from the first article configuration, wherein the first and/or second article picking tooling comprises one or more pluralities of individual gripping heads, each plurality of gripping heads being position and motion controlled;

wherein each of the individual gripping heads is position and motion controlled; and wherein one or more support rails are mounted on a frame or robot comprising a vertical moving mechanism for enabling a vertical movement of the gripping heads to pick up a configuration of articles.

2. A system according to claim 1, wherein the intermediate configuration of articles consists of a plurality of said first article configurations.

3. A system according to claim 2, wherein the control system is enabled to synchronize the pace and pitch of the gripping heads of the second article picking tooling with the pace and pitch of the output transportation unit.

4. A system according to claim 1, wherein the second configuration of articles consists of at least a part of at least two consecutive first article configurations.

5. A system according to claim 1, wherein the gripping heads are mounted on independent, motion-controlled movers on one or more support rails on the first and/or second article picking tooling.

6. A system according to claim 1, wherein at least the first article picking tooling comprises a plurality of support rails mounted in parallel and a support rail moving mechanism for varying the distance between said support rails.

7. A system according to claim 1, wherein the individual gripping heads are adapted to selectively orientate an individual article during said transfer.

8. A system according to claim 1, wherein the control system controls the movement of support rails and the movement of its gripping heads such that the gripper heads achieve a gripper head configuration in accordance with the configuration of the articles on the infeed transportation unit and/or on the intermediate transportation unit.

9. A system according to claim 1, wherein the articles at the infeed transportation unit are in transit while the control system is enabled to synchronize the pace and pitch of the gripping heads of the first article picking tooling with the pace and pitch of the articles present at the infeed transportation unit.

10. A system according to claim 1, wherein the articles are beverage containers.

11. A packaging machine comprising a system according to claim 1.

12. A packaging machine according to claim 11, wherein the output transportation unit transports the configuration of articles during assembly, and wherein the control system is enabled to synchronize the pace and pitch of the gripping heads of the second article picking tooling with the pace and pitch of said packaging in configuration of articles during its assembly.

13. An article picking and placing method comprising the steps of:

providing an intermediate transportation unit configured in between an article infeed transportation unit and an article output transportation unit;

picking and/or forming a first configuration of articles from the infeed transportation unit with a first article picking tooling and transferring it to the intermediate transportation unit, thereby forming an intermediate configuration on said intermediate transportation unit, and picking a second configuration of articles from said intermediate transportation unit with a second article picking tooling and transferring it to the output transportation unit, wherein the second and intermediate article configurations are different relative to each other and each different from the first article configuration, wherein the first and/or second article picking tooling comprises one or more pluralities of individual gripping heads, each plurality of gripping heads being position and motion controlled;

wherein each of the individual gripping heads is position and motion controlled; and wherein one or more support rails are mounted on a frame or robot comprising a vertical moving mechanism for enabling a vertical movement of the gripping heads to pick up a configuration of articles.

* * * * *